United States Patent [19]

Clark et al.

[11] Patent Number: 4,507,104
[45] Date of Patent: Mar. 26, 1985

[54] ECCENTRIC PULLEY FOR INELASTIC TIMING BELT

[75] Inventors: John I. Clark, Milford; Leo Wologodzew, Huntington, both of Conn.

[73] Assignee: Pitney Bowes Inc., Stamford, Conn.

[21] Appl. No.: 499,660

[22] Filed: May 31, 1983

[51] Int. Cl.³ .............................................. F16H 7/10
[52] U.S. Cl. ..................................... 474/112; 474/133
[58] Field of Search ............... 474/112, 101, 113, 115, 474/133, 136, 110

[56] References Cited

U.S. PATENT DOCUMENTS

| | | | |
|---|---|---|---|
| 1,227,541 | 5/1917 | Kaplan | 474/133 |
| 1,422,809 | 7/1922 | Anderson | 474/133 |
| 1,701,820 | 2/1929 | Morse | 474/112 |
| 2,204,972 | 6/1940 | Rouan et al. | 101/235 X |
| 2,273,295 | 2/1942 | Strother et al. | 101/235 |
| 2,332,152 | 10/1943 | Knauer | 226/143 |
| 2,456,414 | 12/1948 | Heyel | 101/235 |
| 3,060,760 | 10/1962 | Minnis | 474/112 |
| 3,785,220 | 1/1974 | Jacobs | 474/110 |

Primary Examiner—James A. Leppink
Assistant Examiner—Thuy M. Bui
Attorney, Agent, or Firm—Lawrence E. Sklar; William D. Soltow, Jr.; Albert W. Scribner

[57] ABSTRACT

Apparatus for maintaining substantially constant tension in an inelastic timing belt driven by a rigid, swinging arm, including a driven, circular pulley, an eccentrically mounted, circular idler pulley, an inelastic timing belt mounted about the driven and idler pulleys to provide minimum tension at mid-motion and maximum tension at the start and end of motion, and a rigid swinging arm pivotably mounted equidistant from the centers of the driven and idler pulleys and secured at one end to the timing belt.

5 Claims, 6 Drawing Figures

ECCENTRIC PULLEY FOR INELASTIC TIMING BELT

BACKGROUND OF THE INVENTION

The instant invention relates to a timing belt or cable, and more particularly to an inelastic timing belt or cable driven by a rigid swinging arm.

In a mechanism wherein a timing belt (defined for purposes of this specification and claims appended thereto to include a cable) mounted on conventional pulleys is driven by a rigid swinging arm attached at one end to the timing belt, tension (or slack) in the timing belt changes because the arm tip (point of connection to the belt) does not follow a theoretical elliptical path which would maintain a constant tension in the belt but rather traces the arc of a circle which arc is transmitted to the straight section of the belt. As the arm tip swings from a position near one pulley to the midpoint of the belt section equidistant from the two pulley centers, tension in the timing belt increases from a minimum to a maximum.

The variation in the tension (or slack) in the timing belt prevents precise motion and accurate positioning of the components driven by the belt, beginning with the driven pulley. This desirable and simple system utilizing one belt and a rigid swinging arm is thereby rendered unusable in many applications. An elastic belt, sized to provide minimum tension at the start and finish of motion, stretches at mid-motion producing excessive friction loads in the pulley bearings. Use of an elastic belt also causes errors in positioning the driven components in proportion to the magnitude of the driven load. Thus, an elastic belt provides no real answer to the problem of the variable tension in the belt.

An inelastic belt, sized to provide minimum tension at mid-motion will have excessive slack at the start and finish of motion and will fail to provide precise positioning of the driven components. The instant invention accordingly overcomes the problem of excessive slack at the start and finish of motion when an inelastic belt is used by providing continuous compensation at negligible increase in cost and complexity of parts. The continuous compensation is achieved by using a pulley so designed to remove slack from an inelastic belt at both ends of the travel and to restore slack at the mid-point of the motion. The effect is virtually identical to that obtained by a change in the center distance between conventional pulleys by an amount necessary to take up the slack in an inelastic belt introduced by a swing from mid-motion to either end.

SUMMARY OF THE INVENTION

The instant invention provides apparatus for maintaining substantially constant tension in an inelastic timing belt driven by a rigid, swinging arm, and includes a driven, circular pulley, an eccentrically mounted, circular idler pulley, an inelastic timing belt mounted about the driven and idler pulleys to provide minimum tension at mid-motion and maximum tension at the start and end of motion, and a rigid swinging arm pivotably mounted equidistant from the centers of the driven and idler pulleys and secured at one end to the timing belt.

DETAILED DESCRIPTION

Figure 1:
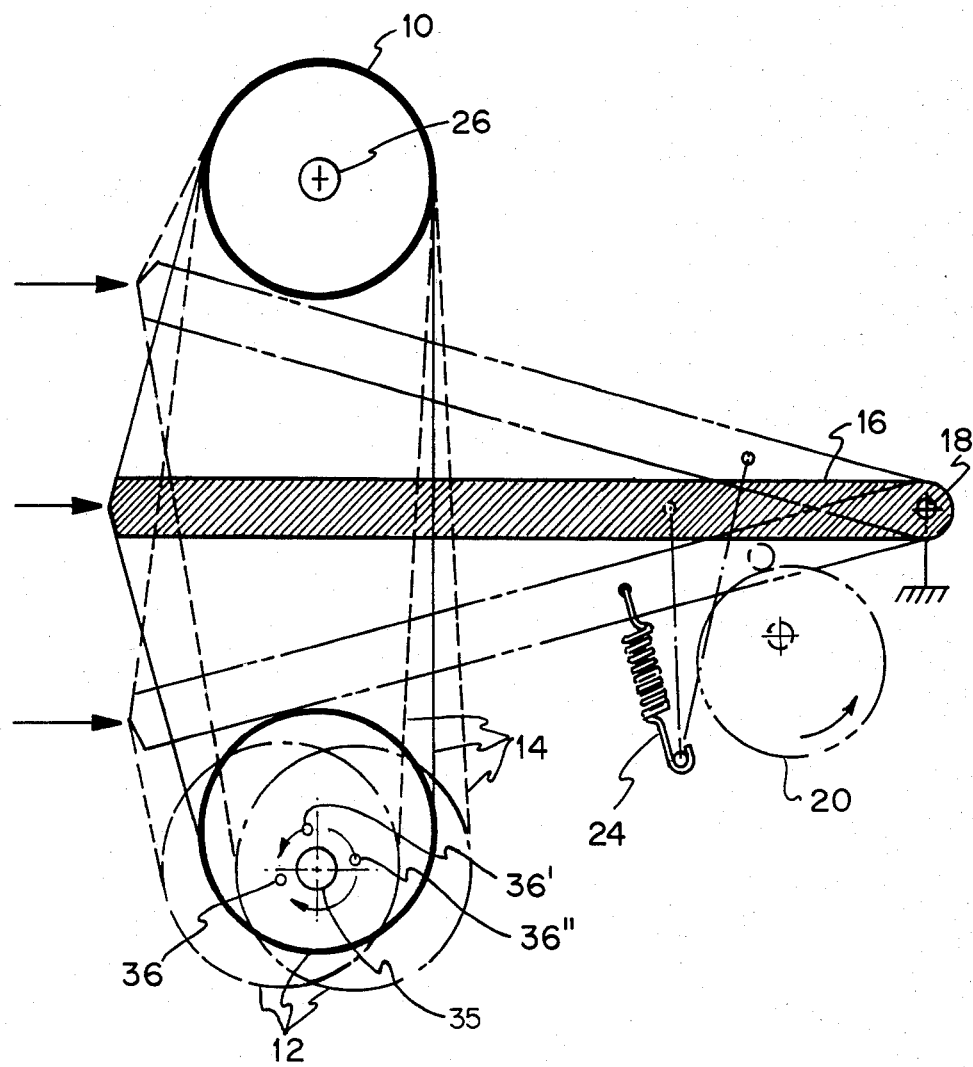
FIG. 1 is a schematic, top, plan view of a timing belt and rigid swinging arm in accordance with the instant invention showing the arm at the start, mid-point and end of the motion.

In describing the preferred embodiment of the instant invention, reference is made to the drawings, wherein there is seen in FIGS. 1-5 a driven pulley 10, an idler pulley 12 and a timing belt 14 trained around the driven pulley 10 and the idler pulley 12. A rigid swinging arm 16 pivots about point 18 and is secured at its other end to the timing belt 14. A cam 20 (see FIGS. 2-5) engages a cam follower 22 on the rigid swinging arm 16 to thereby drive the arm 16 successively through the positions shown in FIGS. 2-5. A coil spring 24 is secured to the rigid swinging arm 16 and biases the arm 16 toward the home position shown in FIGS. 2 and 5.

Referring now to FIGS. 2-5, the driven pulley 10 is fixedly secured to a shaft 26 which in turn is fixedly secured to a feed roller 28 which engages a backup roller 30 to define a nip for feeding sheet material 32 from a roll 34. In a representative application of the instant invention, the sheet material 32 comprises tape being fed from a mailing machine base to a postage meter for printing thereon of postage indicia.

Figure 2:
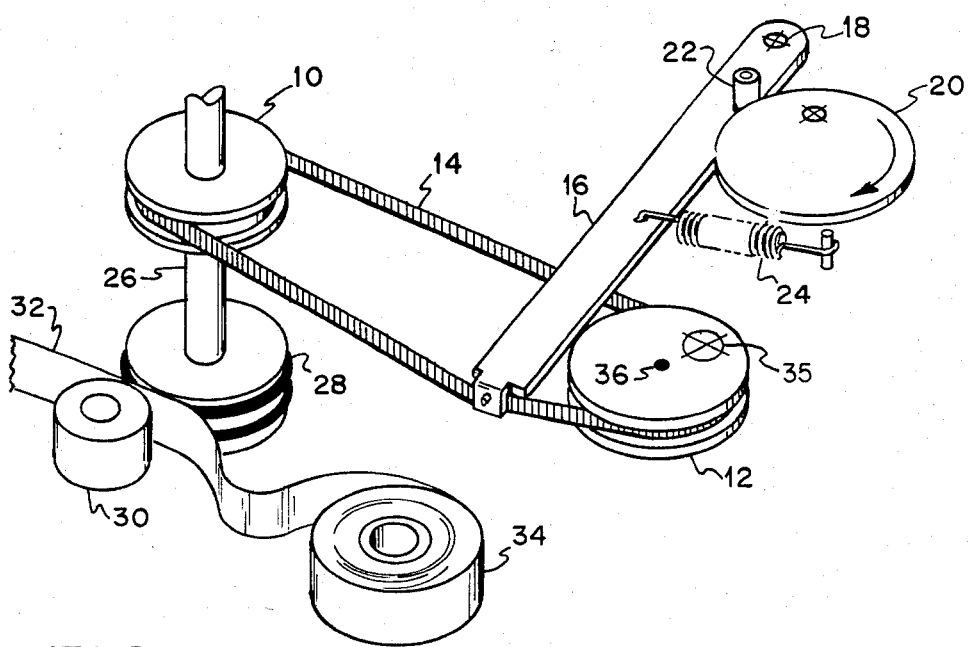
FIG. 2 is a perspective view of a timing belt and rigid swinging arm in accordance with the instant invention, with the rigid swinging arm shown at its start of motion.
Figure 3:
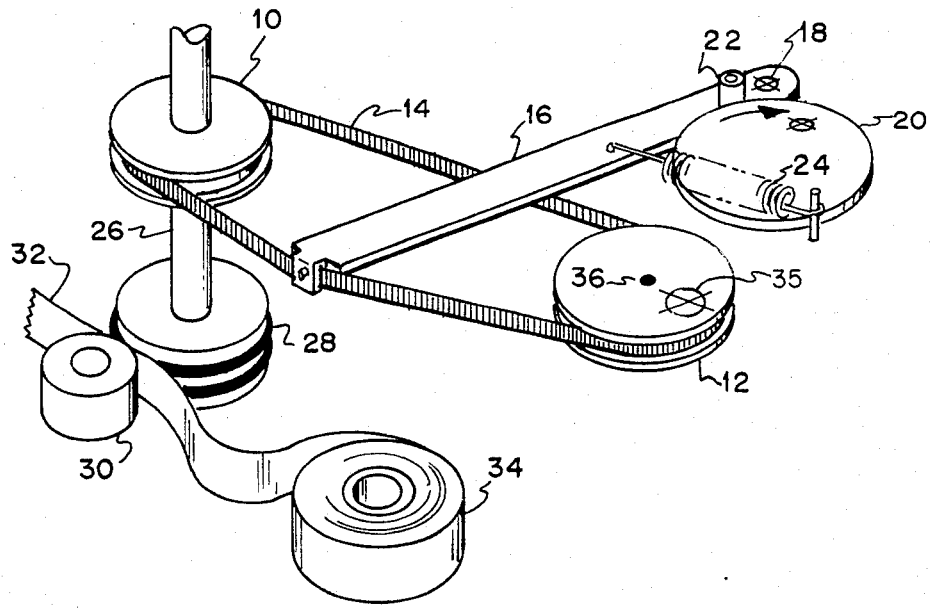
FIG. 3 is the same as FIG. 2 except the rigid swinging arm is shown at the mid-point of its motion.
Figure 4:
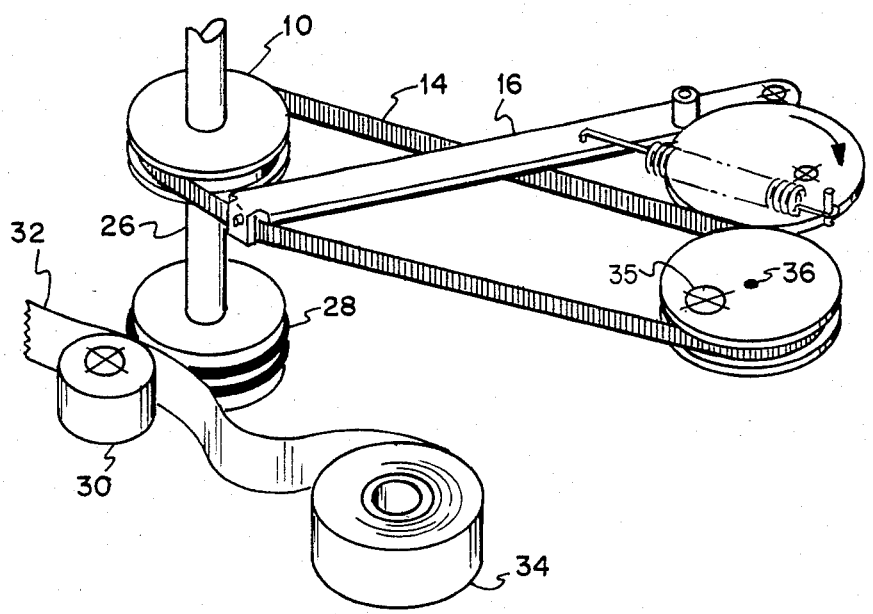
FIG. 4 is the same as FIG. 2 except the rigid swinging arm is shown at the end of its motion.
Figure 5:
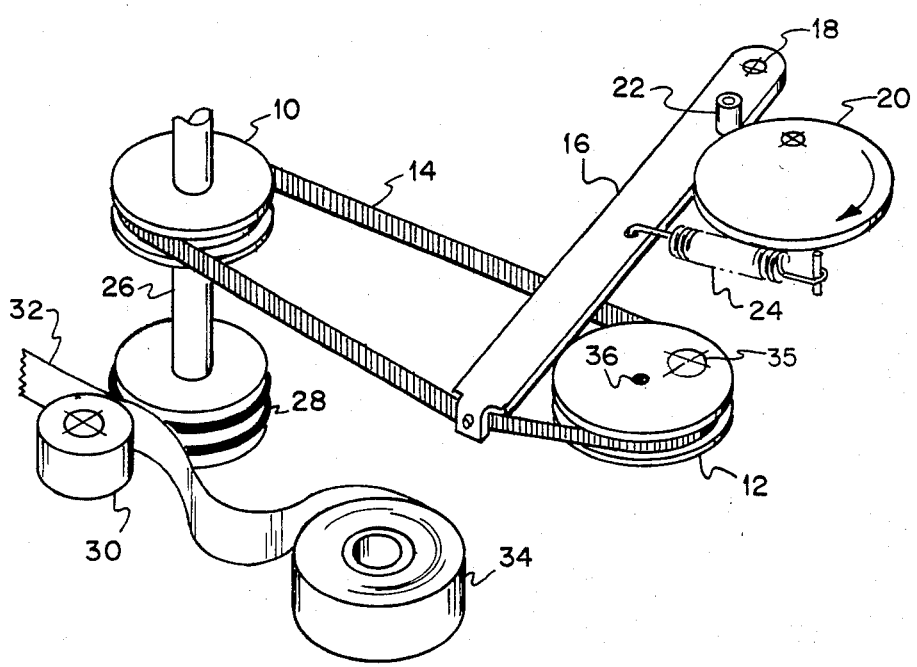
FIG. 5 is the same as FIG. 1 and is shown in order to illustrate the complete cycle of the rigid swinging arm.

In the embodiment shown in FIGS. 2-5, the idler pulley 12 is provided with a circumference equal to twice the distance of the belt travel, i.e. the distance the belt moves in going from the start position shown in FIG. 2 to the end position shown in FIG. 4. The idler pulley 12 rotates about a shaft 35 which, as seen in FIGS. 2-5, is eccentrically offset from the center 36 of the idler pulley 12 by the required change in center distance between conventional pulleys. The eccentric idler pulley 12 makes ½ revolution during a full swing of the rigid swinging arm 16, the pulley 12 and the arm 16 going from the start position shown in FIG. 2 to the mid-point position shown in FIG. 3 to the end position shown in FIG. 4. Clearly, the pulley 12 and arm 16 return to the start position as shown in FIG. 5 by reversing the motion indicated by FIGS. 2-4. The timing belt 14 is meshed with the eccentric pulley 12 so that the pulley 12 is positioned to provide minimum slack at the start position seen in FIG. 2 and the end position seen in FIG. 4 and to provide maximum slack at the mid-point position seen in FIG. 3. The center 36 of the pulley 12 rotates in a circle as seen in FIG. 1, with the start position represented by the reference numeral 36, the mid-point position by the reference numeral 36' and the end position by the reference numeral 36".

Figure 6:
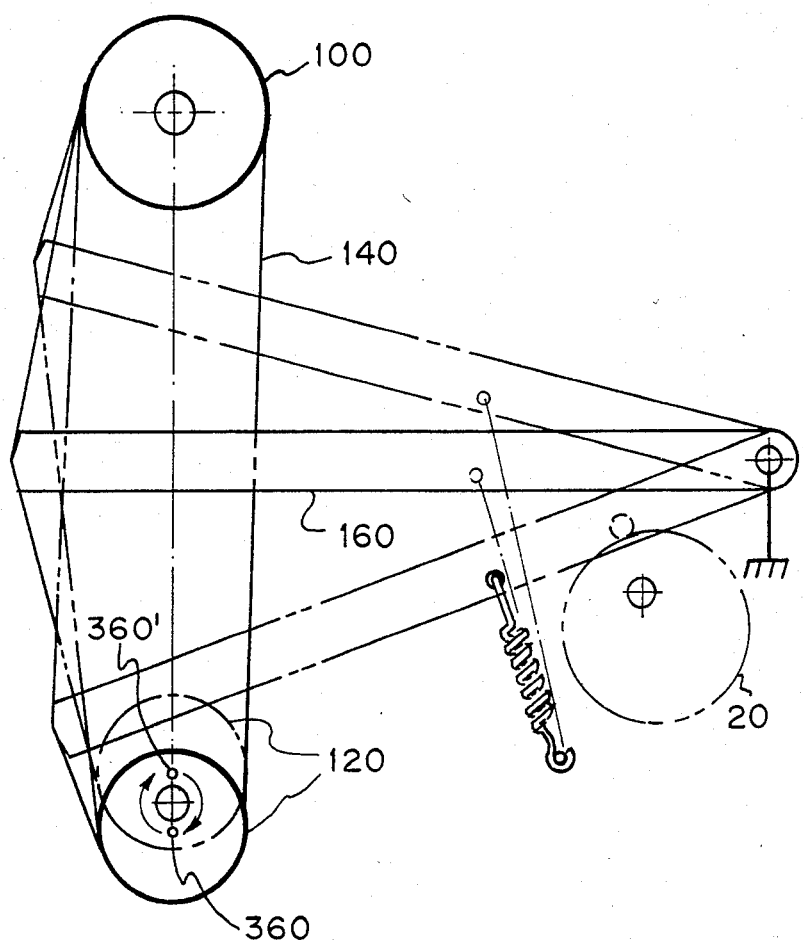
FIG. 6 is the same as FIG. 1 but shows an alternative embodiment.

An alternate embodiment of the instant invention, represented in FIG. 6, utilizes a driven pulley 100 and an eccentric idler pulley 120 having a circumference equal to the distance of the travel of the belt 140 which means that the idler pulley 120 has a circumference equal to ½ that of the idler pulley 12. The pivot of the pulley 120 is also eccentrically offset from the center by an amount equal to ½ the required change in center distance between conventional pulleys. The eccentric pulley 120 makes one full revolution during a full swing of the rigid swinging arm 160, the pulley 120 and the arm 160 rotating clockwise from the start position to the mid-point position to the end position, all depicted in FIG. 6. The pulley 120 and the arm 160 return to their start positions by reversing the clockwise motion described above. The timing belt 140 is meshed with the eccentric pulley 120 so that the pulley 120 is positioned to provide minimum slack at the start and end positions and maximum slack at the mid-point position. The center 360 of the pulley 120 rotates in a circle as seen in FIG. 5, with the start and end positions represented by the reference numeral 360 and the mid-point position by the reference numeral 360'.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

What is claimed is:

1. Apparatus for maintaining substantially constant tension in an inelastic timing belt driven by a rigid, swinging arm, comprising:
   a driven, circular pulley;
   an eccentrically mounted, circular idler pulley;
   an inelastic timing belt mounted about said driven and idler pulleys; and
   a rigid, swinging arm pivotably mounted equidistant from the centers of the shafts of said driven and idler pulleys and secured at one end to said timing belt, whereby minimum tension is provided to said timing belt at its mid-motion and maximum tension is provided to said timing belt at the start and end of its motion.

2. The apparatus of claim 1, wherein the idler pulley has a circumference equal to twice the distance of the belt travel.

3. The apparatus of claim 2, wherein the idler pulley makes ½ revolution during a full swing of the rigid, swinging arm.

4. The apparatus of claim 1, wherein the idler pulley has a circumference equal to the distance of the belt travel.

5. The apparatus of claim 4, wherein the idler pulley makes one full revolution during a full swing of the rigid, swinging arm.

* * * * *